Patented Oct. 14, 1930

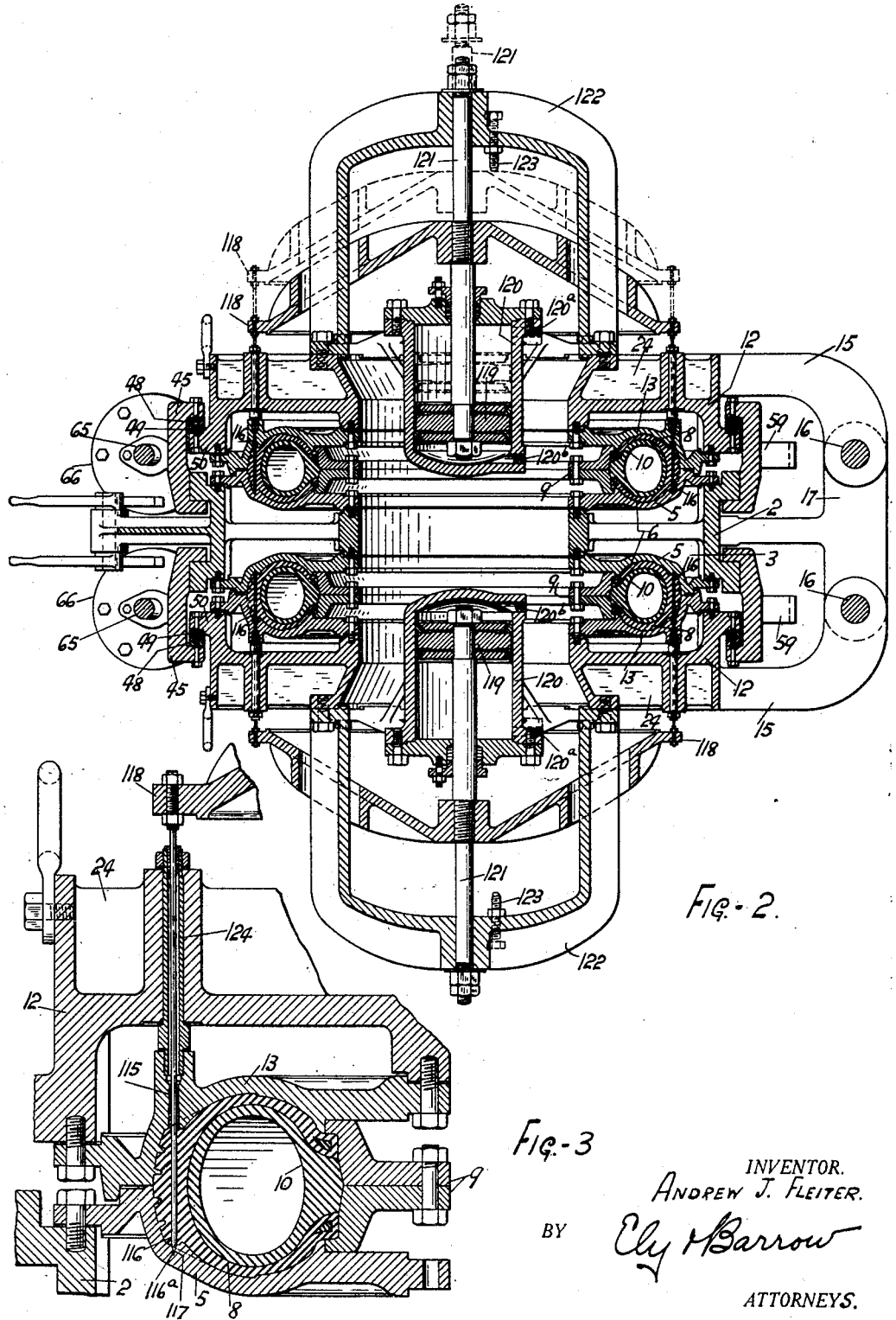

1,778,071

UNITED STATES PATENT OFFICE

ANDREW J. FLEITER, OF AKRON, OHIO, ASSIGNOR TO THE LAMBERT TIRE AND RUBBER COMPANY, A CORPORATION OF OHIO

METHOD AND APPARATUS FOR VULCANIZING TIRES

Application filed April 26, 1928. Serial No. 272,910.

This invention relates to procedure and apparatus for vulcanizing tires with transverse apertures or pockets.

Heretofore in making such tires, molds have been employed in which are seated aperture-forming cores about which the rubber must flow under the vulcanizing heat and pressure. This frequently causes pockets and weakened formations about the apertures which have detrimental effects on the wearing and riding qualities of the tire.

The general objects of the present invention are to provide in tire vulcanizing equipment simple, effective means for formng transverse apertures, or pockets in tire, particularly of that pneumatic type having small openings through a comparatively heavy tread portion and to provide procedure for vulcanizing such transversely apertured tires whereby dependence is not placed upon flow of the rubber under heat and pressure about the forming elements and the product is greatly improved.

The foregoing and other objects of the invention are attained by the vulcanizer and procedure disclosed herein in connection with the accompanying drawings, it being understood that this disclosure is illustrative only and that the invention may be embodied or carried out by other apparatus within the scope of the appended claims.

Of the drawings,

Figure 2 is a section on line 2—2 of Figure 1; and

Figure 3 is an enlarged detail section of a mold and the improved aperture forming means.

Figure 1:
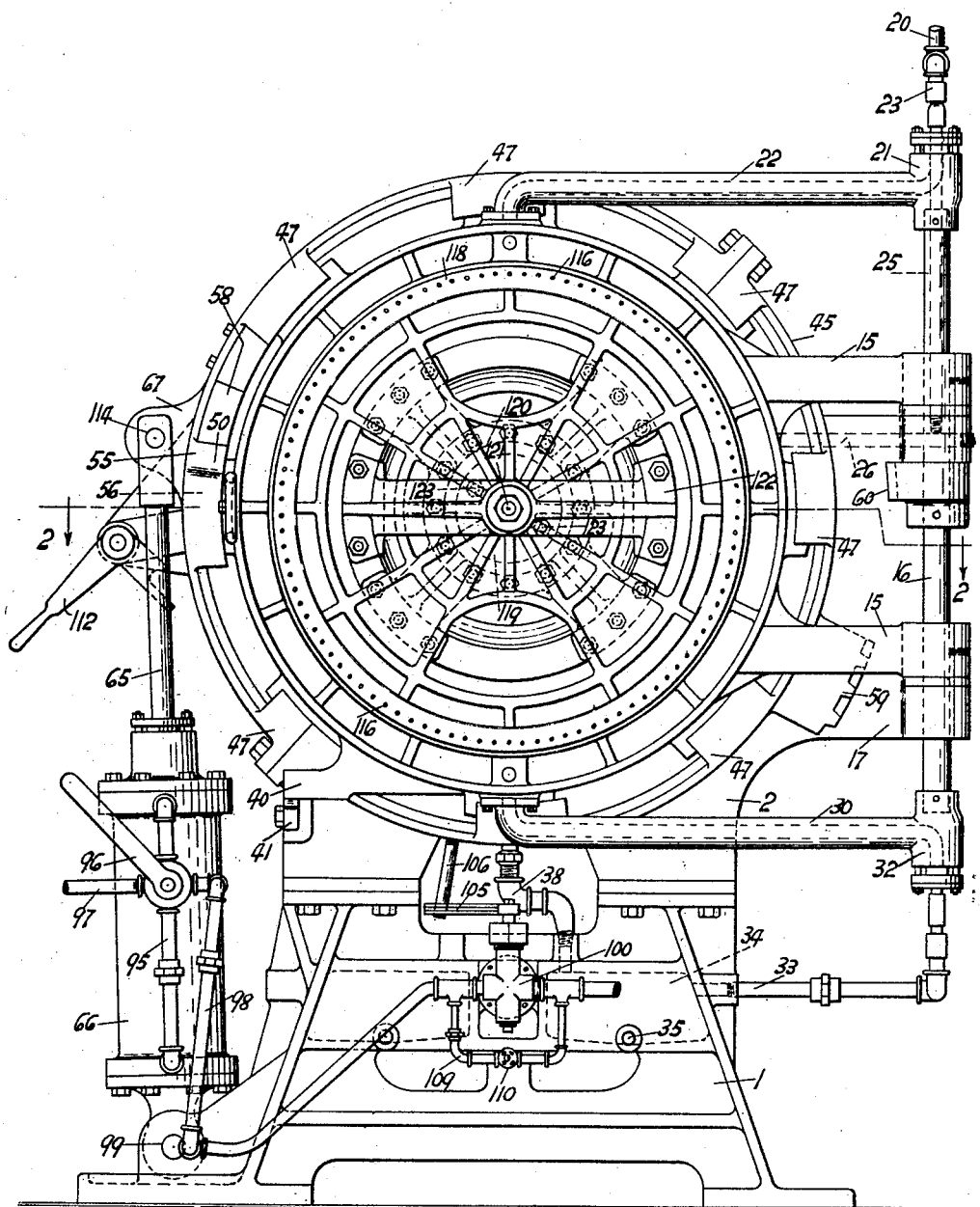
Figure 1 is a side elevation of a watchcase vulcanizer embodying and adapted to carry out the invention.

The watchcase vulcanizer shown comprises the usual standard or base plate 1, upon the upper surface of which is secured the central stationary mold member 2, which is internally chambered as at 3, for the circulation of steam, the sides of the chamber being closed by removable and replaceable plates 5 having molding cavities 6 formed therein. Each of these plates constitutes one section or side of a molding cavity, molds being here shown as designed for the vulcanization of a pneumatic tire, although the shape of the cavity may be altered for the molding of other articles. The tire is shown at 8, mounted upon the usual curing ring 9 and having an air bag or expansible core 10 therein. The molding cavities are enclosed by the swinging or movable mold members 12 which are also chambered, being closed in by removable plates 13 similar to the plates 5. These movable mold members are carried upon brackets 15 which are secured to vertical pintles or hinge pins 16, which are mounted for rotation in arms or brackets 17 extending from the central or stationary member.

In order to introduce steam in the vulcanizer economically and without excessive piping, the steam is conducted from a stationary supply pipe 20, preferably located over head, provided with branches 23, each of which passes through a stuffing box 21 secured to the upper end of the hinge pin 16. A rigid hollow arm 22 extends from the stuffing box to the upper most point in the swinging member where the steam is admitted to the rear of the plate 13, the outer side of the plate being chambered at 24 for the purpose of insulating the movable mold member. To admit steam to the central or stationary mold member the hinge pin is provided with a vertical passageway 25 which communicates at its lower end with a horizontal passage 26 in the bracket 17, and thence to the chamber 3.

Steam passes out of the movable mold members through the pipe 30, which is rigidly attached to the lower side of the movable member, in the same manner as the pipe 22 and communicates with a stuffing box 32 on the lower end of the hinge pin 16. The discharge passage from each movable mold member is connected by piping 33 to a chamber 34 where the condensate collects, being removed through the drain 35. The steam from the stationary mold member passes out through pipe 38 to the same condensate chamber.

As the movable mold sections are brought into contact with the stationary sections they are guided and accurately centered by means of lugs 40 projecting from the lower side of the swinging members and adapted to ride upon rigid arms or positioning members 41 projecting from the stationary members.

Each movable section is designed to be locked against the stationary section by means of a rotating locking and clamping ring 45 which is rotatably mounted upon a rib 46 formed in the stationary section, this ring having a plurality of equally spaced arms 47, the inner surfaces of which are provided with tapered wearing plates 48. These plates are adapted to be brought into registration with and to ride upon corresponding tapered wearing surfaces 49 in lugs 50 projecting from the swinging mold members. As the ring is rotated in one direction the mold will be locked about its outer periphery, and as it is rotated in the opposite direction until the lugs are out of registration, it will be unlocked. The clamping ring is provided with a single elongating cam or drawing lug 55 which is located at a point opposite the hinge of the mold, which is designed to engage a cam surface 56 on one of the lugs and effect a preliminary closing of the mold. This also serves to "rim" up the tires on the clamping rings, which for this purpose may be attached to the mold sections rather than connected together as shown in Figure 2. On the opening movement of the clamping ring the mold is cracked, to break the adhesion between the two mold sections and is then partially opened by a combined breaking and opening lug 58 in the locking ring adapted to engage a lug 50 on the movable sections. The complete opening of the movable sections is accomplished by means of a short gear sector 59 on the ring which engages a corresponding sector 60 in the hinge pin 16, at the termination of the rotation of the ring which moves the swinging section to its full open position. The locking ring is moved to effect the various movements by means of a piston 65, actuated by the cylinder 66 and attached at its upper end to an ear 67 in the locking ring.

Means are provided for throttling the fluid pressure which operates the piston 65. Fluid pressure is admitted to the upper and lower ends of the cylinders through pipes 95 controlled by a hand operated valve 96 which communicates with the exhaust 97. Fluid pressure is admitted to the valve through a pipe 98 which is pivoted coaxially with the pivot 99 of the cylinder. This pipe is supplied through a valve casing 100 mounted in the base of the machine. The fluid under pressure (air or water) passes through the center of the casing, in the path of which is arranged a suitable throttle mechanism (not shown) provided with a forked arm 105 adapted to be engaged by a pin 106 on the ring. As the ring moves the fluid pressure is lessened. The by pass 109 with valve 110 provides for regulation of the pressure admitted to the cylinder around the throttle valve.

In order to prevent accidental operation of the closing mechanism by the lever 96, a swinging catch 112 is located in the path of pin 114 on the piston 65. To operate the apparatus it is necessary for the operator to move both levers 96 and 112 simultaneously.

The embodiment of the present invention as applied to the vulcanizer described in the preceding paragraphs comprises the provision in the mold members or sections 13 of a circumferential series of transverse apertures 115, 115 adapted to receive aperture forming elements 116, 116 to provide circumferentially spaced apertures through the treads of tires 8. The elements 116, 116 are formed with sharpened or pointed ends 116$^a$ so that they may be forced through the tread rubber of a tire expanded in the molds and sockets are provided at 117, 117 in mold members 5 to receive the pointed end 116$^a$ of elements 116. Elements 116 are mounted for simultaneous action on each mold by being secured to a spider 118 mounted on each movable mold member 12 for reciprocatory movement thereon. A piston 119 in a cylinder 120 supported centrally of each of members 12 is provided for actuating each spider. Fluid under pressure for each cylinder 120 may be supplied or relieved through suitable connections indicated at 120$^a$ and 120$^b$. Each piston rod 121 to which spider 118 is secured is supported at its outer end in a bearing bracket 122. Outward movement of each spider 118 is limited by a set screw 123. The elements 116 are supported and guided in apertures 124 formed in members 12 through which said elements extend for movement into and out of the molds.

The operation of the vulcanizer will be understood from the foregoing description. In carrying out the process, the tires to be vulcanized, after being mounted in place ready to be vulcanized, are first expanded in the molds by admission of fluid pressure to bags 10 in the usual way, the elements 116 being withdrawn to the dotted line position indicated at the top of Figure 2 during this operation. The elements 116 are then actuated to pierce through the tread rubber of the tires and seat in sockets 117. The vulcanization is proceeded with and completed in the usual way, elements 116 remaining in the full line positions shown throughout the period of vulcanization. After completion of the vulcanization, elements 116 are withdrawn and the vulcanizer is opened and the tires removed in the customary manner.

Modifications of the invention may be resorted to without departing from the spirit thereof or the scope of the appended claims.

It is apparent that the invention is not necessarily limited to the formation of apertures in the tire which are parallel to the axis, but may be modified to permit the diagonal movement of the piercing elements so as to form apertures which pass from a point on one side of the tire to a circumferentially advanced point on the other side. Nor is the invention limited to the formation of apertures extending through the tire, as the pins may be stopped short of one side, thereby forming recesses opening from one side of the tire alone. Neither is it limited to the provision of piercing elements on one side of the mold only as they may project into either or both sides of the tire.

What is claimed is:

1. Apparatus for vulcanizing tires with transverse apertures in the tread thereof, said apparatus comprising a pair of cooperating half-mold members, one of said members having a circumferential series of transverse apertures therein adjacent the periphery thereof, means to expand a tire enclosed in said mold, and piercing elements carried by a mold member and actuatable through said said apertures to form transverse apertures in said tread.

2. In a vulcanizer comprising relatively movable mold sections, one of said sections being apertured to receive core elements, and a member reciprocable on and mounted on said mold section and carrying core elements actuatable through said apertures.

3. In a pneumatic tire vulcanizer, relatively movable mold sections, one of said sections being apertured to receive core elements through the tread portions thereof, a member movable on said mold section and carrying a series of core elements actuatable through said apertures, and means for expanding a tire enclosed in said mold sections 4. In a pneumatic tire vulcanizer, relatively movable mold sections, one of said sections being apertured to receive core elements through the tread portion thereof, and a member movable and mounted on said mold section and carrying a series of core elements actuatable through said apertures.

5. That method of making pneumatic tires with transverse tread apertures comprising enclosing the tire in a mold expanding the tire against the tread portion of the mold, piercing the tread of the tire with aperture forming elements actuated into the mold, and vulcanizing the tire in the mold with the aperture forming elements therein.

6. That method of making pneumatic tires with transverse apertures in the tread comprising enclosing the tire in a mold, expanding the tire in the mold, and forcing the elements into the tread to form the apertures.

7. That method of vulcanizing pneumatic tires provided with transverse tread openings, comprising enclosing a tire in a vulcanizing mold, expanding the tire in the mold, forcing coring elements into the tread of the expanded tire and vulcanizing the tire while the coring elements are retained therein.

8. In a watch-case tire mold, having a door and a molding cavity, core pins mounted on the door and adapted to be advanced into and withdrawn from the molding cavity and mechanism for moving the pins into and withdrawing the same from the molding cavity.

9. In a tire mold of the sectional type having a molding cavity, one of said mold sections having apertures to permit passage of core pins, core pins mounted on said apertured mold section and adapted to be advanced into and withdrawn from the molding cavity and mechanism for moving the pins into and withdrawing them from the molding cavity, said mechanism comprising a pin carrying ring, means to mount said ring for movement along the direction of the axis of the mold, and means including a power cylinder, control valve and connections between the same and said ring for operating the ring for the purpose described.

10. In a tire mold of the sectional type having an annular molding cavity, one of said mold sections having apertures to permit passage of core pins, core pins mounted on said apertured mold section and adapted to be advanced into and withdrawn from the molding cavity, mechanism mounted on said apertured mold section for moving the pins into and withdrawing them from the molding cavity, and means for operating said mechanism.

11. The combination of a tire mold having an annular molding cavity, of a carrying ring mounted on said mold, core pins carried by said ring, said mold having apertures for the passage of said pins into and from the molding cavity, mechanism mounted on said mold for advancing the pins into and withdrawing the same from the molding cavity, and means for operating said mechanism.

ANDREW J. FLEITER.